S. B. WILLIS.
SPOON HANDLE.
APPLICATION FILED JUNE 10, 1914.
1,121,701.
Patented Dec. 22, 1914.
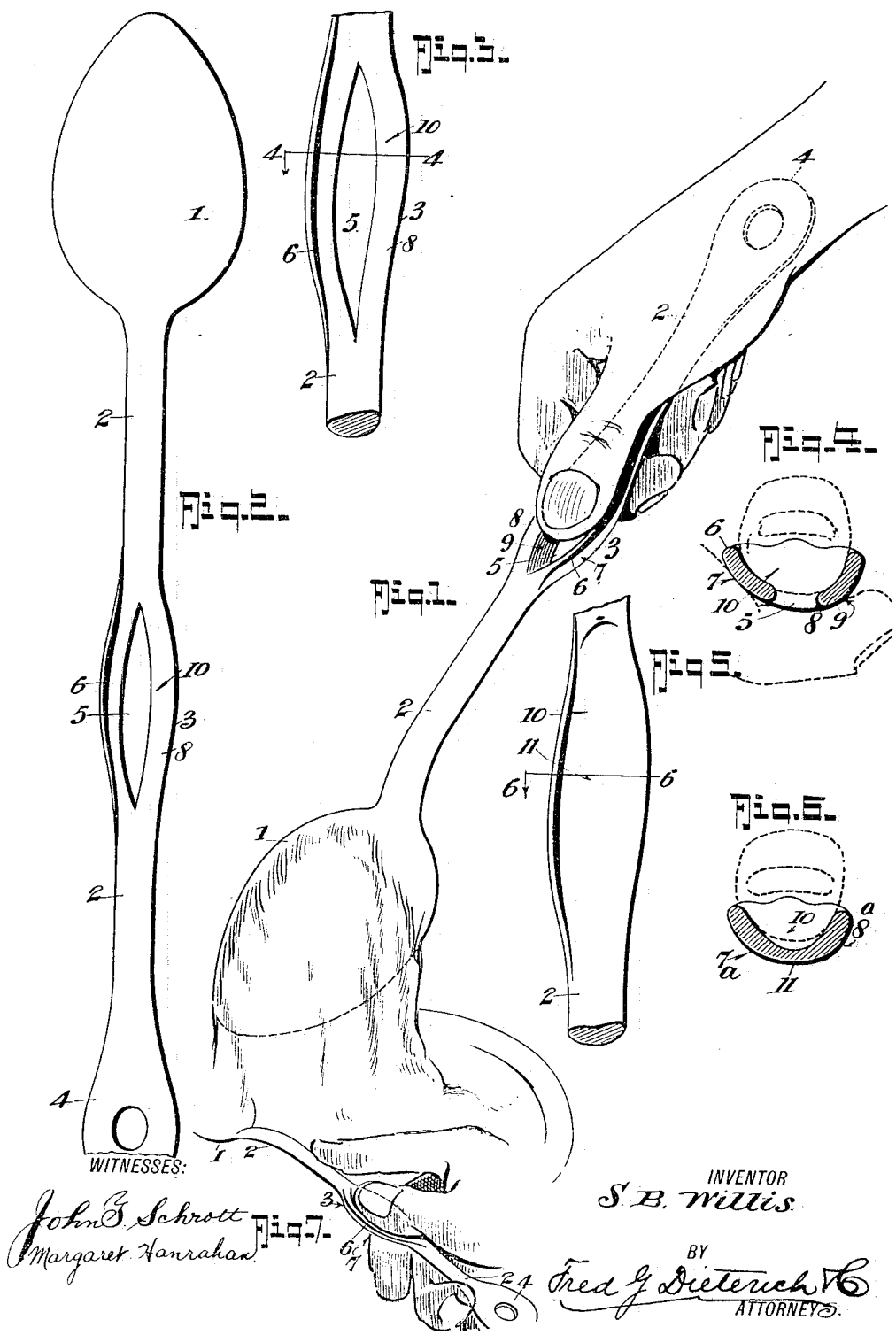

UNITED STATES PATENT OFFICE.

SALLIE B. WILLIS, OF RICHMOND, VIRGINIA.

SPOON-HANDLE.

1,121,701.  Specification of Letters Patent.  Patented Dec. 22, 1914.

Application filed June 10, 1914. Serial No. 844,236.

*To all whom it may concern:*

Be it known that I, SALLIE B. WILLIS, residing at Richmond, in the county of Henrico and State of Virginia, have invented a new and Improved Spoon-Handle, of which the following is a specification.

My invention is an improved handle for kitchen spoons and the like.

Heretofore long handled spoons which are in general use in batter mixing and stirring operations are usually provided either with round or flat handles. Practice has demonstrated that the round handled spoons have a tendency to turn in the hand and require a great grip to hold them, while the flat handled spoons often discomfort the hand of the user.

Therefore, it is the principal object of my invention to provide a spoon with a handle that embodies the advantages of both the round and flat types and yet eliminates their objectionable features.

In carrying out my invention, I provide the handle with a portion between the extremities, wider and of general concavo-convex form, the form of the same being shaped to the natural curvature of the hand, the concavity serving as a convenient thumb recess whereby the spoon may be readily held from turning, with but little effort and without injury to the hand.

More subordinately the invention includes those novel details of construction, all of which will be first fully described in detail, and then be specifically pointed out in the appended claims and illustrated in the accompanying drawing, in which:

Figure 1 is a perspective view showing my invention in use. Fig. 2 is a plan view of the same. Fig. 3 is an enlarged plan view of the concavo-convex portion of the handle. Fig. 4 is a cross section on the line 4—4 of Fig. 3. Fig. 5 is a view similar to Fig. 3, of a slight modification. Fig. 6 is a cross section similar to Fig. 4 on the line 6—6 of Fig. 5. Fig. 7 is a detail perspective view illustrating how the spoon is grasped in the act of stirring or mixing a compound.

In the drawing, in which like numerals and letters of reference indicate like parts in all of the figures, 1 represents the bowl of the spoon and 4 the eye of the handle 2. The handle 2, between the bowl 1 and the eye 4, is provided with a laterally enlarged portion 3 of the concavo-convex form. In the first form of the invention illustrated, the portion 3 is apertured as at 5. The under side of the wall of the enlarged portion of the handle is formed of curvatures 7 and 9 that conform to the natural curvature of the hand, the curvatures 7 and 9 being the outside or convex curvatures of the handle sections 6 and 8 respectively, the inner or concave curvature 10 of which is shaped to conform to the natural curvature of the thumb.

In the form shown in Figs. 5 and 6, a web 11 closes the opening 5. In other respects it is essentially the same as the form shown in Figs. 1, 3 and 4.

In the modification shown in Figs. 5 and 6, the convex surface is formed by the curvatures $7^a$—$8^a$ which merge with the bottom of the web 11.

From the foregoing description taken in connection with the accompanying drawing, it is thought the complete construction and advantages of my invention will be readily apparent to those skilled in the art to which the invention relates.

What I claim is:

1. A spoon having a handle that portion of which that is adjacent to the bowl being round and substantially circular in cross section and that portion of which that is at the extremity being flattened, said handle including an intermediate gripping and thumb receiving portion of concavo-convex cross section.

2. A spoon including a handle having a portion intermediate the ends laterally widened and curved in longitudinal and cross section to conform to the curvature of the hand, the upper side of said portion being concaved to form a thumb recess.

SALLIE B. WILLIS.

Witnesses:
KATE G. WILLIS,
R. W. COFFEE.